US005542781A

United States Patent [19]
Yemington et al.

[11] Patent Number: 5,542,781
[45] Date of Patent: Aug. 6, 1996

[54] METHOD AND APPARATUS FOR REMOVING CONTAMINATED SURFACE SOIL

[75] Inventors: Charles R. Yemington; John H. Skaggs; William R. Bath, all of Houston, Tex.

[73] Assignee: Sonsub, Inc., Houston, Tex.

[21] Appl. No.: 226,284

[22] Filed: Apr. 11, 1994

[51] Int. Cl.$^6$ ..................................................... B09B 1/00
[52] U.S. Cl. .............................................. 405/128; 37/414
[58] Field of Search .............................. 405/128; 37/348, 37/366, 382, 414, 443; 111/903, 904; 172/4.5–6, 393; 367/118, 127, 907

[56] References Cited

U.S. PATENT DOCUMENTS

| | | | |
|---|---|---|---|
| 4,631,884 | 12/1986 | Deal | 37/443 X |
| 4,706,773 | 11/1987 | Reinaud | 172/5 X |
| 4,820,041 | 4/1989 | Davidson et al. | 172/4.5 X |
| 4,839,061 | 6/1989 | Manchak, Jr., et al. | 405/128 X |
| 4,924,450 | 5/1990 | Brashear et al. | 367/118 |
| 5,065,019 | 11/1991 | Darilek et al. | 37/414 X |
| 5,100,229 | 3/1992 | Lundberg et al. | 172/4.5 X |
| 5,220,876 | 6/1993 | Monson et al. | 111/903 X |
| 5,346,210 | 9/1994 | Utke et al. | 307/118 |
| 5,355,815 | 10/1994 | Monson | 111/903 X |
| 5,375,663 | 12/1994 | Teach | 172/4.5 |
| 5,433,032 | 7/1995 | Bath et al. | |

*Primary Examiner*—Ramon S. Britts
*Assistant Examiner*—Frederick L. Lagman
*Attorney, Agent, or Firm*—Pravel, Hewitt, Kimball & Krieger

[57] ABSTRACT

A removal apparatus which includes a container adapted to store removed soil, which is supported from the end of a crane, which applies a downward load on the container to keep it against the contaminated soil and advancing forward. The removal apparatus features a replaceable blade which is attached at the forward end of the container at a predetermined level to define the depth of the cut. Vertical cheek plates are attached at either side of the container to cut the end of the soil at the outer edges of the blade and to provide vertical side wall support to confine the soil within the container. Front and rear dust control chambers are provided which restrict the movement of airborne contaminants. The container includes a sensor to monitor the level of contaminated soil remaining after a cut. Prior to removal, an initial survey is made of the area is made using a sensor capable of determining the level of the contaminants in the soil. Contamination levels are recorded for a number of the positions, resulting in a map of the area. A display of the contamination levels is provided to the operator of the removal apparatus, which has its position monitored and shown on the display. The sensor on the container provides a sensor reading of the contamination level in the soil remaining after the cut. This sensor reading updates the contamination level value previously obtained, with the updated level being provided on the display.

16 Claims, 6 Drawing Sheets

METHOD AND APPARATUS FOR REMOVING CONTAMINATED SURFACE SOIL

BACKGROUND OF THE INVENTION

1. Field of the Invention

The present invention relates to a system for removing contaminated surface soil. More particularly, the present invention relates to a system for mapping the location of contaminated surface soil prior to removal operations, monitoring the location of the removal apparatus to reduce the amount of uncontaminated soil removed and updating the mapping after the removal of contaminated soil.

2. Description of the Related Art

There are many sites where the surface soil is contaminated by hazardous materials such as chemicals, heavy metals, NORM (Naturally Occurring Radioactive Material) or other radioactive materials. Typical examples include radioactive mineral mining and processing sites, oil drilling and production sites, and oil field maintenance areas where NORM contaminated pipe and other equipment was cleaned. Normally the contaminated material lies at or near the surface and is often mixed with the surface or top layers of soil.

Environmental clean up of these areas requires that the contaminated soil be collected and stored or processed to remove or otherwise retain the contaminated materials. A common technique to accomplish this task is to remove the surface soil on the site with standard earth moving equipment. During such removal process, it is necessary to provide for the entrapment of any contaminants that would otherwise become airborne, primarily by windblown action. Thus, it is desirable to control dust during the removal process.

Additionally, since objects in waste soil tend to migrate toward the surface, it is preferable to remove the surface soil in thin layers so that the buried objects and other contaminants can be detected before they are disturbed. This removal process frequently results in excessive clean or uncontaminated soil being removed along with the contaminated soil, increasing the cost of removing, transporting, and processing or storing the removed soil. Handling, processing, and storage costs increase in direct proportion to the amount of material to be processed. Minimizing the amount of soil to be processed therefore minimizes the cost. Further, removing the clean soil increases the time spent performing the removal process, further increasing costs.

SUMMARY OF THE PRESENT INVENTION

The present invention relates to a system for removing a predetermined amount of contaminated surface soil and reducing the amount of uncontaminated soil removed, thereby decreasing the overall time required to perform the removal operation. The removal apparatus includes a container adapted to store the removed soil which is supported from the end of a backhoe, excavator or other crane. The backhoe, excavator or other crane, provides the mechanism for applying a downward load on the container to keep it against the contaminated soil and a mechanism for advancing the container forward. The removal apparatus also features a replaceable blade which is attached at the forward end of the container at a predetermined level thereby defining the depth of the cut. Vertical cheek plates are attached at either side of the container which serve to cut the end of the soil at the outer edges of the blade and to provide vertical side wall support for the container to confine the soil within the container. Front and rear dust control chambers are provided which restrict the movement of airborne contaminants during the excavating activities. Further, the container includes a sensor to monitor the level of contaminated soil remaining after a cut.

Prior to removal, an initial survey is made of the area to be excavated. The survey is made using a sensor capable of determining the level of the contaminants in the soil. The sensor is moved over the area, with the position of the sensor being monitored during the movement. Contamination levels are recorded for a number of the positions, resulting in a map of the contamination in the area. This map is preferably kept in a computer system to allow display of contamination levels of the area. This display is provided to the operator of the removal apparatus, which preferably also has its position monitored and shown on the display. The operator then guides the removal apparatus over the contaminated soil portions. The sensor on the container provides a sensor reading of the contamination level in the soil remaining after the cut. This sensor reading updates the contamination level value previously obtained, with the updated level being provided on the display. If the level is above the allowable limit, the operator can make another cut without moving the backhoe, excavator or other crane. The final contamination levels, as recorded from the container sensor, then provide a record which can be used for regulatory purposes.

By providing the display of contamination levels and the location of the removal apparatus the operator need only remove contaminated soil and can stop removal operations when an uncontaminated soil region is encountered. Further, the operator can avoid movement from a contaminated to an uncontaminated region, limiting the spreading of contaminants. Additionally, the updated level information allows the operator to more efficiently remove several layers of contaminated soil without backtracking. Thus the amount of uncontaminated soil which is removed is reduced and the overall removal time is decreased.

BRIEF DESCRIPTION OF THE DRAWINGS

In order to more fully understand the drawings referred to in the detailed description of the present invention, a brief description of each drawing is presented.

DETAILED DESCRIPTION OF THE INVENTION

Figure 1:
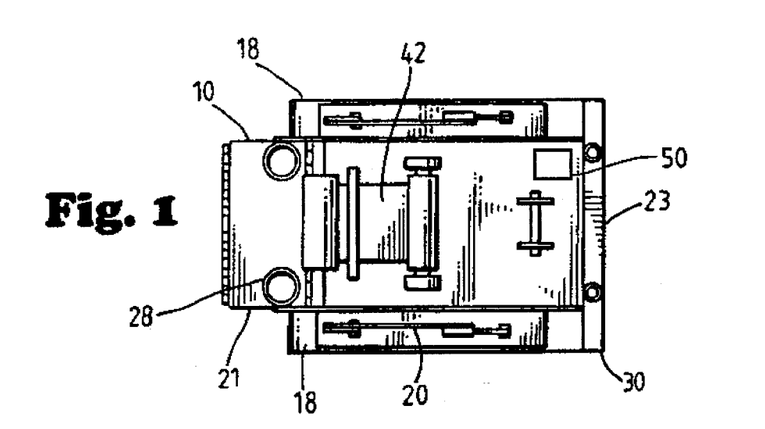
FIG. 1 is a top view of a removal apparatus according to the present invention.
Figure 2A:
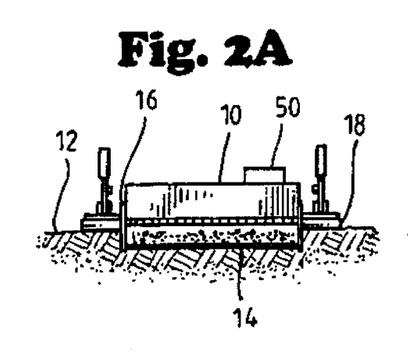
FIG. 2A is a front elevation view of the removal apparatus of FIG. 1.
Figure 2B:
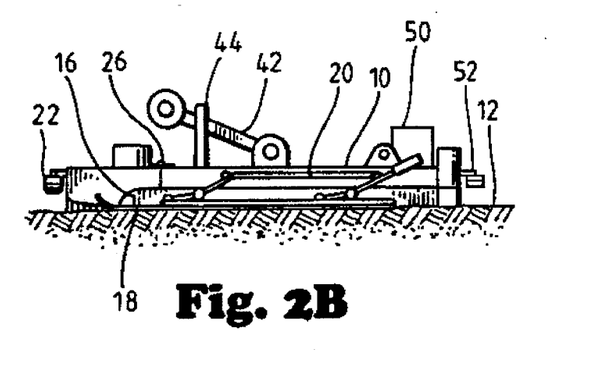
FIG. 2B is a side view of the removal apparatus of FIG. 1 making a first cut.
Figure 3A:
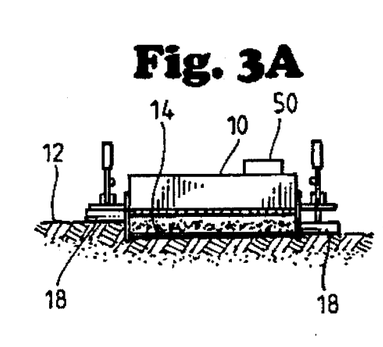
FIG. 3A is a front view of the removal apparatus of FIG. 1 making a subsequent cut.
Figure 3B:
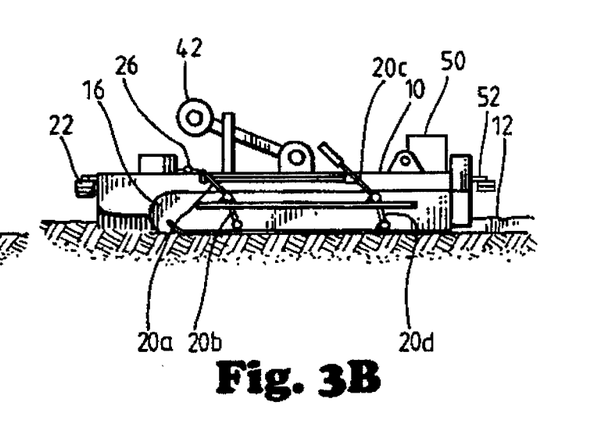
FIG. 3B is a side view of the removal apparatus of FIG. 1 making a subsequent cut.

Referring to FIGS. 1, 2A–2B and 3A–3B, container 10 is shown resting on soil 12. A blade 14 is mounted at the lower leading edge of the container 10. The container also includes a bottom plate 11, an end plate 13 and a top plate 15 (see FIG. 6). Two vertical cheek plates 16 are attached to the side of the container and cut the soil on either side of blade 14. In this manner, blade 14 separates the bottom portion of the soil while the front end of cheek plates 16 cut the outer edge of the soil and confine it within the container. The horizontal control plates 18 are attached to the sides of the container through a linkage assembly 20 comprising a series of linkage legs 20a–d which provide for the manual extension of the horizontal control plate relative to the container. In this manner, once an initial cut has been performed as shown in FIGS. 2A and 2B, the left-hand horizontal control plate can be lowered as shown in FIGS. 3A and 3B to insure that the container remains level with the soil while the next pass is made.

The horizontal control plates 18 also serve to pack the soil after the cut. The bottom plate 11 serves to compact the recently disturbed soil before the next pass is made.

A first sensor mount 22 is attached to the leading edge of the container 10 and is adapted to support radiation sensors and other monitors which may be used to survey material in the top soil before it enters the container 10. A second sensor mount 52 is attached to the trailing edge of the container 10 and is adapted to support radiation sensors and other monitors which may be used to survey materials in the top soil after a cut is performed. Sensors in the sensor mounts 22 and 52 are connected to an RF and ultrasonic transmitter unit 50. The RF transmitter portion transmits the sensor readings to a tracking and recording system 80 (FIGS. 8 and 9) to allow recording of the sensor readings at a given location. The ultrasonic transmitter portion provides an ultrasonic signal used to locate the position of the container 10.

Figure 4:
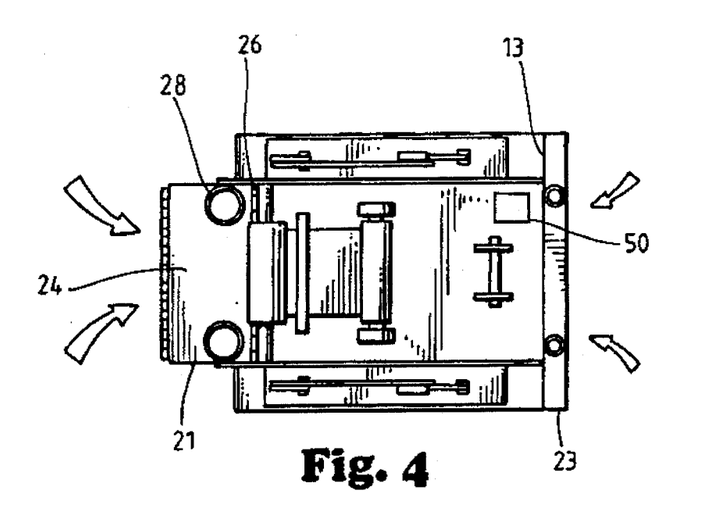
FIG. 4 is a top view of the removal apparatus of FIG. 1 focusing on dust control features.
Figure 5:
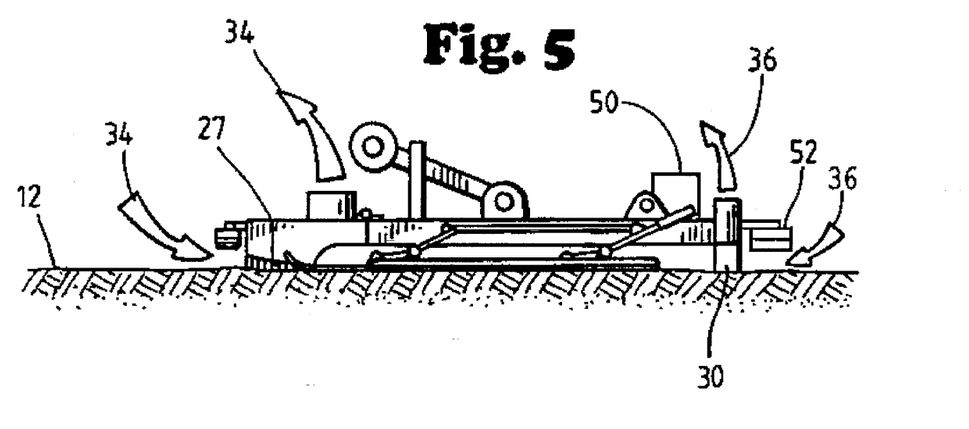
FIG. 5 is a side view of the removal apparatus of FIG. 1 focusing on dust control features.

Referring now to FIGS. 4 and 5, a front region 21 and a rear region 23 are provided for dust control. Front region 21 is defined by a dust cover 24 which is attached over the forward end of the container, preferably hinged along line 26. Flexible and vertical dust covers 27 form the side walls of the front region. Hose connections 28 are provided at the top of plate 24 enabling the connection of flexible hoses and the drawing of a vacuum through an exhaust hose to remove the dust and other airborne contaminants as it enters the container.

The rear region 23 is a vacuum manifold 30 which is attached at the trailing edge 13 of the container. The exhaust manifold 30 includes hose connections 32.

Arrows 34 show the circulation of air in the front region 21 or forward dust collection chamber. Arrows 36 show the flow of air in the rear region 23 through the vacuum manifold 32.

Figure 6:
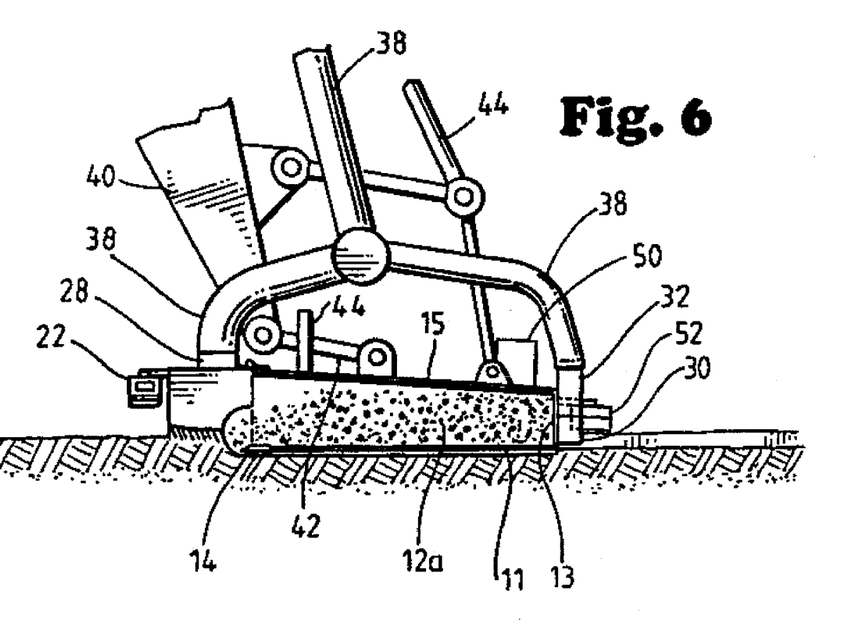
FIG. 6 is a cross-sectional side view of the removal apparatus of FIG. 1 attached to a backhoe.
Figure 7:
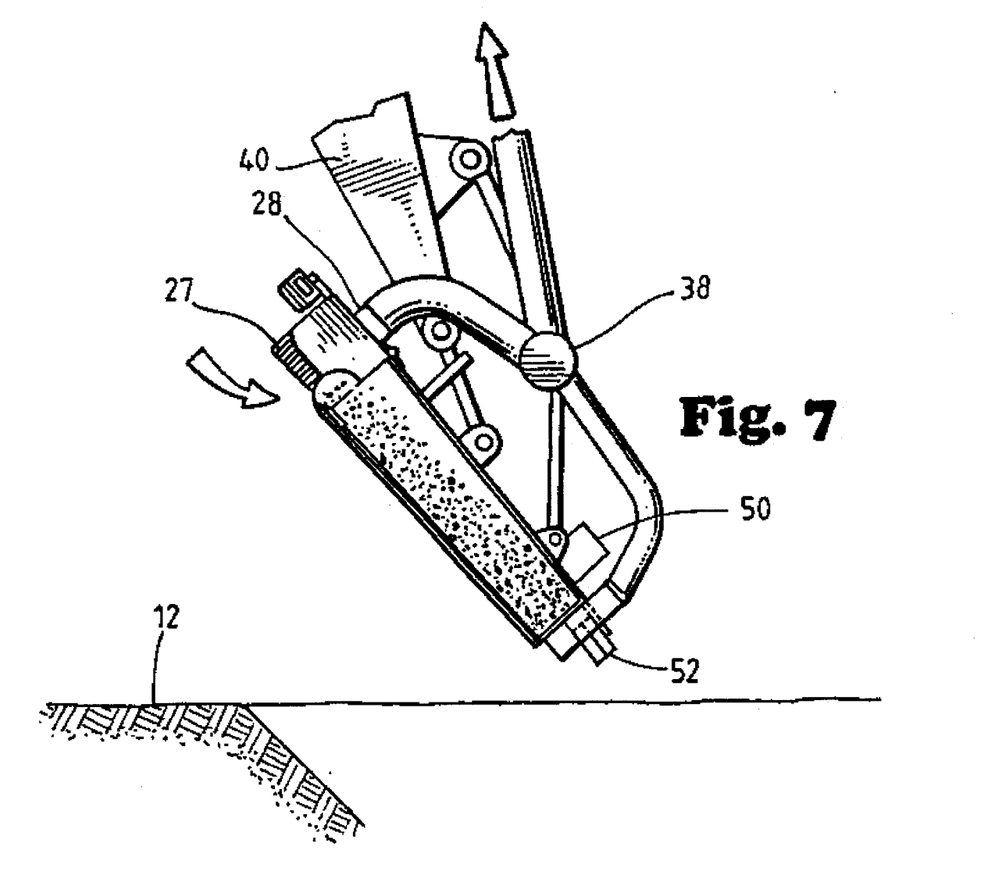
FIG. 7 is a cross-sectional side view of the removal apparatus of FIG. 1 attached to a backhoe in a upwardly moving position.

Referring now to FIGS. 6 and 7, hoses 38 are shown attached to connections 28 and 32. In this manner, an exhaust fan (not shown) may draw the airborne particles from the front region 21 and rear region 23 upwardly away from the excavation site.

Referring still to FIGS. 6 and 7, the present invention is shown in a cross-sectional view attached to the working end of a backhoe. The backhoe arm 40 is attached to a torsional mount 42 which is normally held in an upward mode by a spring (not shown) contained within housing 44. The backhoe arm 40 includes a series of linkages 44 which are attached to the top plate 15 of container 10 and are used to rotate the container as well as advance it forward in an operating mode. Blade 14 is shown a predetermined distance below the surface of the soil cutting the soil.

As the apparatus is advanced forward by the motion of the backhoe 40, soil 12a is pushed within the container and remains there.

FIG. 7 shows the lifting of the container by the backhoe. In this mode, the air vacuum continues to draw an exhaust on the system as it is lifted to prevent any dust or other contaminants from entering the environment until the soil has been emptied from the container and the backhoe returns the container to its original position for a subsequent cut.

Figure 8:
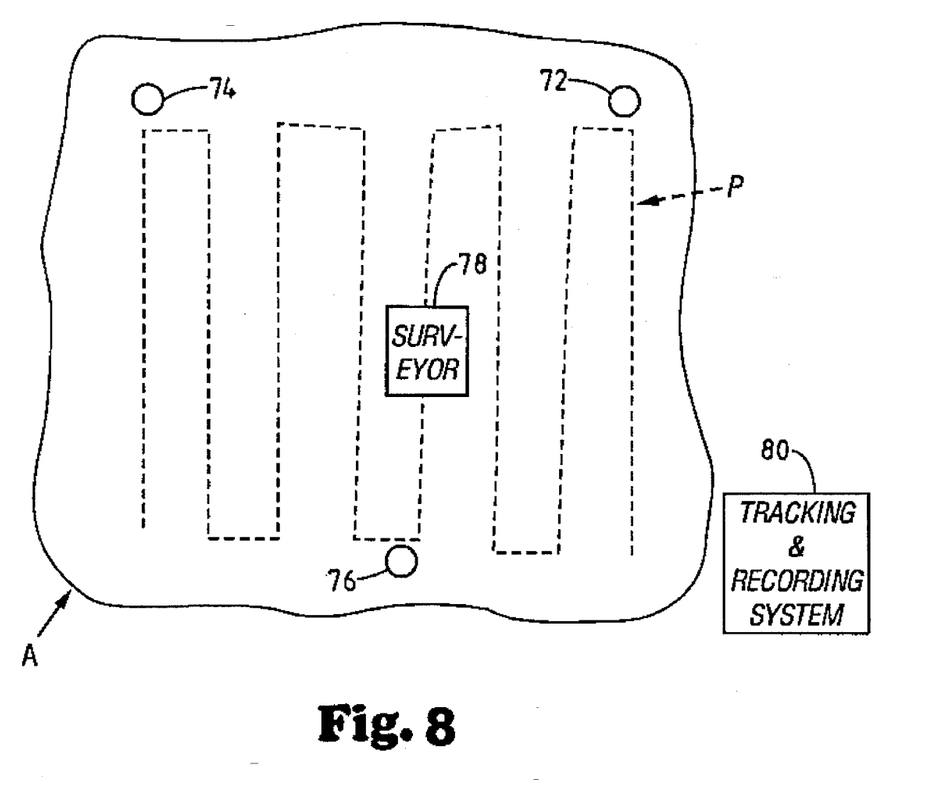
FIG. 8 is a top view of an area to be excavated illustrating the initial survey arrangement.

Referring now to FIG. 8, an area A to be excavated is illustrated. Three ultrasonic receivers 72, 74 and 76 are provided in a triangle, with the vertices of the triangle generally being outside the area A. The ultrasonic receivers 72, 74 and 76 receive the ultrasonic signals provided by an ultrasonic and RF transmitter and sensor unit 78 carried by a surveyor, either an individual or a mobile vehicle, which can be either locally or remotely controlled. The ultrasonic transmitter portion of the unit 78 provides periodic ultrasonic signal pulses to the receivers 72, 74 and 76. The receivers 72, 74 and 76 are connected to a tracking and recording system 80 which correlates the ultrasonic signals received by the receivers 72, 74 and 76 to determine the position of the surveyor.

The RF transmitter portion of the unit 78 provides the readings from the sensor in the unit 78 to the tracking and recording system 80. The sensor is of the type to measure the particular contaminant of interest in the soil to be removed. Thus the tracking and recording system 80 knows both position of the surveyor and the contamination level at that position. The surveyor traverses a path P to completely map the area A. The tracking and recording system 80 periodically determines the position of the surveyor and the associated contamination level as the surveyor traverses the path P. The tracking and recording system 80 stores this information to develop a map of the area A with contaminant levels for each position. Preferably the periodic determinations are made sufficiently frequently to provide complete coverage of the area A with some overlap and few or no missing regions.

Figure 9:
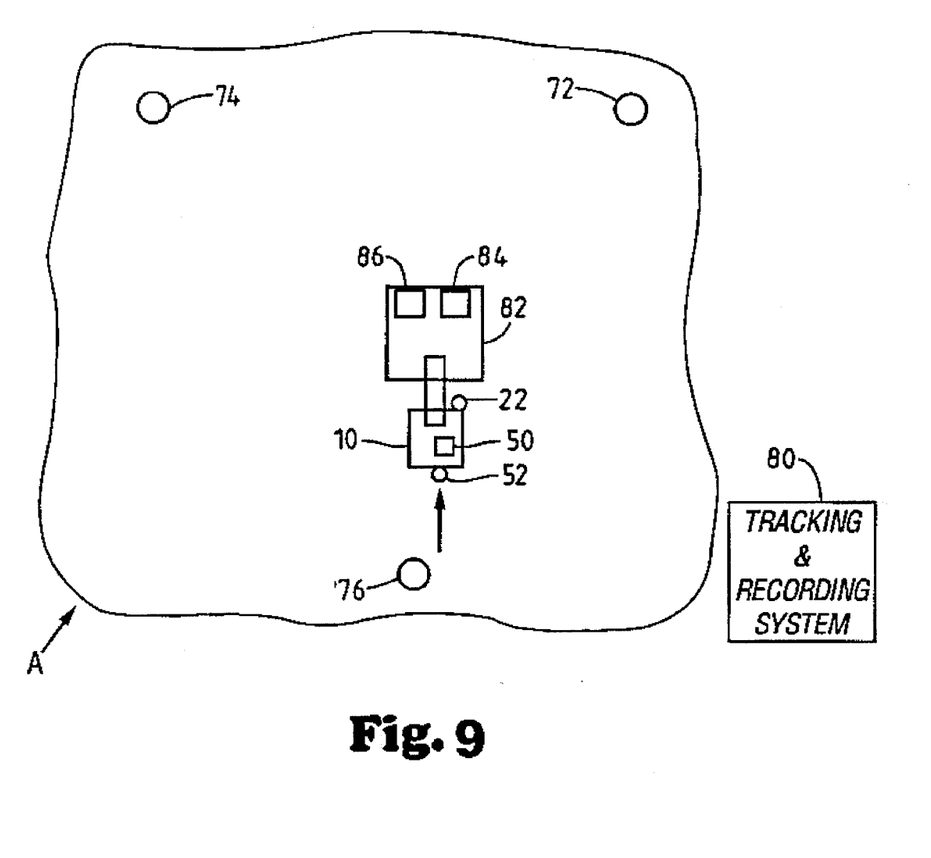
FIG. 9 is a top view of the area of FIG. 8 having soil removed with monitoring of the removal apparatus position and remaining soil contaminant measurement.

Proceeding to FIG. 9, a crane 82 holding the container 10 is shown in the process of removing contaminated surface soil. A computer and RF receiver 84 receives the mapping information from the tracking and recording system 80. This mapping information is provided to a display 86 located in the operator's cab in the crane 82. Alternatively, the crane 82, or other unit such as a backhoe or excavator, could be remotely controlled by the operator, with the computer 84 and the display 86 located at the control station. Thus the operator can readily see a representation of the contamination levels of the area A. The displayed map can be three-dimensional to show contamination levels or can use different colors for contamination levels. The ultrasonic transmitter in the unit 50 is compatible with the receivers 72, 74 and 76 and provides ultrasonic pulses in a fashion similar to the unit 78. This allows the tracking and recording system 80 to determine the location of the container 10 in the area A. This information is provided by the tracking and recording system 80 to the computer 84, which shows the container 10 location on the display 86 in a suitable format. Thus the operator can determine the location of the container 10 with relation to the contamination in the area A. This allows the operator to avoid moving the crane 82 from contaminated to uncontaminated regions, thus reducing spreading of contamination, and to make cuts only in portions where the contaminant level is sufficiently high to require removal of the soil. The cut can be started at the beginning of the contaminated soil and stopped at the end. Further, cuts need be made only in areas of sufficiently contaminated soil. These factors reduce the amount of uncontaminated soil which is removed and decrease the overall time required.

The sensors contained in the first sensor location 22 and the second sensor location 52 provide sensor readings to the tracking and recording system 80 via the unit 50 during removal operations. As the tracking and recording system 80 knows the location of the container 10, the contamination levels of the soil before the cut and after the cut is performed are concurrently determined. The tracking and recording system 80 provides this containment level information to the computer 84, which uses the before the cut information to correlate with the map developed by the survey and uses the after the cut information to update the display 86. Thus the operator receives a real time report of the remaining soil contamination level. If the level is still unsatisfactory, the operator can repeat the cut without moving the crane 82, removing more soil. Removal time is saved as the cuts are made until uncontaminated soil is reached before the crane 82 is moved. If the before the cut information does not satisfactorily correlate with the survey map, a warning can be provided and appropriate action taken.

The tracking and recording system 80 additionally stores the updated contamination levels provided after a cut is performed. This allows later use as documentation of contamination levels for use in necessary reports, both interim and final, for regulatory compliance and billing purposes. Thus the report data is generated concurrently with the removal process, further decreasing the time of the overall operation.

While ultrasonic position determination is preferred, it is understood that many other position determination techniques could be used, such as optical, RF, inertial or a global positioning system (GPS) receiver could be used. Further, while RF transmission to the tracking and recording system 80 and computer 84 is preferred, a wired connection could be readily utilized, as could an infrared technique. Additionally, while use of the container 10 is preferred, other suitable soil removal implements as readily known to those skilled in the art could be used to remove the soil, preferably with a suitable sensor attached to perform the post-removal measurement function described above.

The descriptions given herein are intended to illustrate the preferred embodiment of the apparatus according to the present invention. It is possible for one skilled in the art to make various changes to the details of the apparatus without departing from the spirit of this invention. Therefore, it is intended that all such variations be included within the scope of the present invention as claimed.

What is claimed is:

1. A method for removing contaminated soil in an area, the method comprising the steps of:

surveying the area to develop a map of the contamination level of the soil at predetermined positions;

displaying the map of contaminant levels to an operator of a removal apparatus;

controlling the removal apparatus responsive to commands provided by said operator to remove portions of the contaminated soil based on the displayed map of contaminant levels;

providing the position of the removal apparatus on the displayed map of contaminant levels as the removal apparatus is removing portions of the contaminated soil;

determining the contaminant level of the remaining soil while the removal apparatus is removing the portions of the contaminated soil; and updating the displayed map of the contaminant level based on the determined contaminant level of the remaining soil.

2. The method of claim 1, further comprising the step of:

storing the updated map of contaminant level for documentation purposes.

3. An apparatus for removing contaminated soil in an area, comprising:

a removal apparatus for removing contaminated soil, said removal apparatus being controlled by an operator;

means for surveying the area to develop a map of the contamination level of the soil at predetermined positions;

means for displaying said map of contaminant levels to said operator of said removal apparatus, wherein said operator controls said removal apparatus to remove the contaminated soil based on the displayed map of contaminant levels;

means for providing the position of the removal apparatus on said displayed map of contaminant levels as said removal apparatus is removing the portions of the contaminated soil;

means for determining the contaminant level of the remaining soil while said removal apparatus is removing the portions of the contaminated soil; and means for updating said displayed map of the contaminant level based on said determined contaminant level of the remaining soil.

4. The apparatus of claim 3, further comprising:

means for storing said updated map of contaminant level for documentation purposes.

5. The apparatus of claim 3, wherein said removal apparatus has a forward end and a trailing end and comprises:

a container adapted to store removed soil;

a blade attached at the forward end of said container and positioned to cut a predetermined layer of surface soil;

a means for cutting the edge of the soil at each end of the blade, for providing a vertical barrier to confine the soil within the container and for stabilizing said container;

means for controlling the flow of dust resulting from the cutting of said surface soil; and means for applying a load on said container against said soil to prevent said container from lifting off said soil and for advancing said container.

6. The apparatus according to claim 5 wherein said apparatus further comprises means for sensing the contaminant level of the uncovered soil.

7. The apparatus according to claim 6 wherein said sensing means comprises a radiation sensor.

8. The apparatus according to claim 5 wherein said cutting means comprises:

at least two vertical plates attached to the side of said container;

at least two horizontal plates, each horizontal plate supported at a substantially normal angle to said corresponding vertical plate; and means for moving said horizontal plates relative to said vertical plates.

9. The apparatus according to claim 5 wherein said dust control means comprises:

a first control proximate said blade at the forward end of said container;

a rear control proximate the trailing end of said container; and hoses connecting said first and second controls, wherein said first and second controls define a first and second region, respectively, and open air communication with said hoses for transfer of said airborne particulates from said first and second regions through said hoses.

10. The apparatus of claim 3, wherein said means for surveying the area comprises:

means for measuring contaminant level at a position;

means for moving said means for measuring; and means for determining the location of said means for measuring.

11. The apparatus of claim 10, wherein said means for determining the location includes:

an ultrasonic transmitter connected in fixed relation to said means for measuring;

a plurality of ultrasonic receivers for receiving ultrasonic signals provided by said transmitter; and means for correlating said received ultrasonic signals to determine the position of said ultrasonic transmitter.

12. The apparatus of claim 11, wherein said means for providing the position of said removal apparatus includes an ultrasonic transmitter connected in fixed relation to said removal apparatus and compatible with said plurality of ultrasonic receivers.

13. The apparatus of claim 3, wherein said means for providing the position of said removal apparatus includes:

an ultrasonic transmitter connected in fixed relation to said removal apparatus;

a plurality of ultrasonic receivers for receiving ultrasonic signals provided by said transmitter; and means for correlating said received ultrasonic signals to determine the position of said ultrasonic transmitter.

14. The apparatus of claim 3, wherein said means for displaying includes a computer and a computer display.

15. The apparatus of claim 14, wherein contaminant levels of the soil are displayed in varying colors on said computer display.

16. The apparatus of claim 14, wherein contaminant levels of the soil are displayed in a three dimensional format on said computer display.

* * * * *

UNITED STATES PATENT AND TRADEMARK OFFICE
CERTIFICATE OF CORRECTION

PATENT NO. : 5,542,781

DATED : August 6, 1996

INVENTOR(S) : Charles R. Yemington; John H. Skaggs; William R. Bath

It is certified that error appears in the above-identified patent and that said Letters Patent is hereby corrected as shown below:

Column 3, line 65, after "draw" insert --the vacuum withdrawing--.

Signed and Sealed this

Eighth Day of July, 1997

Attest:

BRUCE LEHMAN

Attesting Officer

Commissioner of Patents and Trademarks